3,590,068
Patented June 29, 1971

3,590,068
ACRYLONITRILES
Werner Toepfl, Basel, and Marcus von Orelli, Munchenstein, Switzerland, assignors to Ciba Limited, Basel, Switzerland
No Drawing. Filed Sept. 29, 1966, Ser. No. 584,052
Claims priority, application Switzerland, Oct. 7, 1965, 13,803/65
Int. Cl. C07c *121/30, 121/40, 121/70*
U.S. Cl. 260—465.4      3 Claims

---

ABSTRACT OF THE DISCLOSURE

Acrylonitriles having the formula

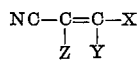

wherein X is chloro, bromo, substituted mercapto, amino or substituted amino or a heterocyclic radical, Y is chloro or bromo and Z is an esterified carboxylic acid group or a carboxamido group substituted or unsubstituted. Such compounds are useful as pesticides particularly as molluscicides.

---

The present invention provides pesticidal, especially molluscicidal, preparations which comprise a compound of the general formula (I)    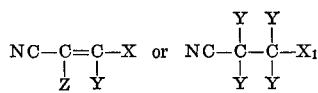    (II)

in which X represents a halogen atom or the group $-SR_1$ or

where $R_1$ stands for a lower alkyl, alkenyl or an aryl or aralkyl radical; $R_2$ and $R_3$ may be identical or different and each represents a hydrogen atom, a saturated or unsaturated aliphatic residue containing up to 12, preferably up to 4, carbon atoms, or an aryl radical or, together with the nitrogen atom, form a 5- or 7-membered ring; Y represents a halogen atom or the group $-SR_4$ in which $R_4$ represents a lower alkyl radical, and Z represents the group $-CN$, $-COOR_5$ or

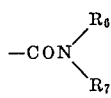

in which $R_5$ stands for a lower alkyl radical, a cyclohexyl, alkenyl or alkoxyalkyl radical, and $R_6$ and $R_7$ may be identical or different and each represents a hydrogen atom, a lower alkyl radical or an unsubstituted or substituted phenyl residue, or together with the nitrogen atom form a 5- to 7-membered ring, and a carrier. The carrier may be a solid or liquid carrier, and may be, for example, one or more of the following additives: Solvents, dispersants, wetting agents and adhesives.

Particularly potent molluscicides are those preparations which contain as active ingredient a compound of the general formula

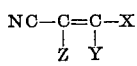      (III)

in which X represents a halogen atom or the group $-SR_1$ or

where $R_1$ represents a lower alkyl or an unsubstituted or substituted phenyl radical, and $R_2$ and $R_3$ may be identical or different and each stands for a hydrogen atom, a lower alkyl radical or an unsubstituted or substituted phenyl residue or, together with the nitrogen atom, represent a ring of 5 to 7, preferably 6, members; Y represents a halogen atom and Z the group $-CN$, $-COOR_4$ or

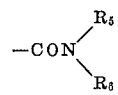

where $R_4$ indicates a lower alkyl radical, and $R_5$ and $R_6$ may be identical or different and each represents a hydrogen atom, a lower alkyl radical or an unsubstituted or substituted phenyl residue or, together with the nitrogen atom, form a ring of 5 to 7, preferably 6, members.

Excellent molluscicidal effects are also obtained with those preparations which contain as active ingredient a compound of the general formula

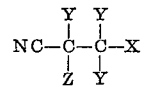      (IV)

in which X represents a halogen atom or the group $-SR_1$ or

where $R_1$ represents a lower alkyl or an unsubstituted or substituted phenyl radical, and $R_2$ and $R_3$ may be identical or different and each stands for a hydrogen atom, a lower alkyl or an unsubstituted or substituted phenyl radical or, together with the nitrogen atom, form a ring of 5 to 7, preferably 6, members; Y represents a halogen atom and Z the group $-CN$, $-COOR_4$ or

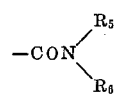

where $R_4$ stands for a lower alkyl radical, and $R_5$ and $R_6$ may be identical or different and each represents a hydrogen atom or a lower alkyl or an unsubstituted or substituted phenyl radical or, together with the nitrogen atom, form a ring of 5 to 7, preferably 6, members.

In this connection there should be specially mentioned those preparation which contain as active ingredient a compound of the formula

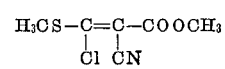

or

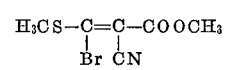

The invention also provides as new compounds, compounds of the Formulae III and IV above. It further provides a process for the manufacture of such compounds which comprises reacting a ketene mercaptal of the general formula $$NC-C=C-SR$$
$$\phantom{NC-}|\phantom{C=C-}|$$
$$\phantom{NC-}Z\phantom{C=}SR$$

in which R represents a lower alkyl radical and Z has the same meaning as defined above in connection with the general Formula III—with a halogenating agent, for example, chlorine, bromine or sulphuryl chloride, preferably in an inert solvent, at a temperature ranging from 0° to 200° C.

The compounds of the general Formulae I and II exhibit, above all, a very good action on molluscs. In addition to this action they also exhibit other biocidal activities, for example, against weeds, harmful microorganisms and nematodes. The new compounds may also be used as cotton defoliants and as insecticides. The systemic fungicidal action of the preparations of the invention deserves special mention.

The preparations of this invention may be applied in a wide variety of forms. For the manufacture of spray solutions of compounds of the general Formulae I and II there may be used, for example, petroleum fractions having a high to medium boiling range, preferably above 100° C., such, for example, as Diesel oil or kerosene, coal tar oils and oils of vegetable or animal origin, as well as hydrocarbons, such, for example, as alkylated naphthalenes, tetrahydronaphthalene, if desired, in conjunction with xylene mixtures, cyclohexanols, ketones or chlorinated hydrocarbons such as tri- and tetrachloroethane, trichloroethylene or tri- or tetrachlorobenzenes.

Aqueous forms of application are prepared, for example by adding water to, for example, emulsion concentrates, pastes or wettable spray powders. Suitable emulsifiers or dispersants are, for example, nonionic products such, for example, as condensation products of aliphatic alcohols, amines or carboxylic acids having a long-chain hydrocarbon residue of about 10 to 20 carbon atoms with ethylene oxide, for example, the condensation product of octadecyl alcohol with 25 to 30 mols of ethylene oxide, or of soybean fatty acid with 30 mols of ethylene oxide, or of commercial oleylamine with 15 mols of ethylene oxide, or of dodecylmercaptan with 12 mols of ethylene oxide. From among the suitable anionic emulsifiers there may be mentioned the sodium salt of dodecyl alcohol sulphuric acid ester, the sodium salt of dodecylbenzene-sulphonic acid, the potassium or triethanolamine salt of oleic or abietic acid or of mixtures of these acids, or the sodium salt of a petroleumsulphonic acid. Suitable cationic dispersants are quaternary ammonium compounds such as cetyl pyridinium bromide or dihydroxyethyl benzyl dodecyl ammonium chloride.

For the manufacture of dusting and casting preparations there may be used as solid vehicles talcum, kaolin, bentonite, calcium carbonate, calcium phosphate or coal, cork meal, wood meal or other materials of vegetable origin. It is also very advantageous to manufacture the preparations in granular form. The different forms of application may contain the usual additives that improve the distribution, the adhesion, the stability to rain or the penetration. As such substances there may be mentioned fatty acids, resins, glue, casein or alginates.

The preparations of this invention may be used by themselves or in combination with conventional pesticides, especially insecticides, acaricides, nematocides, bactericides or further fungicides or herbicides.

As a rule, the active ingredients of the above Formulae I and II are obtained in the form of mixtures of isomers. The cis-forms and the trans-forms can be separated by the usual operations, such, for example, as crystallization.

However, for the manufacture of the preparations of this invention the use of the mixtures of isomers is quite acceptable.

The following examples illustrate the invention. Unless otherwise indicated, parts and percentages in the examples are by weight:

EXAMPLE 1

(1) The following compounds were manufactured by the method described by R. Gompper and W. Töpfl in Chem. Ber. 95, pp. 2861 and 2871 (1962):

(a) 
$$CH_3S-C=C-COOCH_3 \quad M.P.: 84°-86°C.$$
$$\phantom{CH_3S-}|\phantom{=C-}|$$
$$\phantom{CH_3S-}SCH_3\phantom{=}CN$$

(b) 
$$CH_3S-C=C-COOC_2H_5 \quad M.P.: 57°-59°C.$$
$$\phantom{CH_3S-}|\phantom{=C-}|$$
$$\phantom{CH_3S-}SCH_3\phantom{=}CN$$

(c) 
$$H_3CS-C=C-CN \quad M.P.: 80°-82°C.$$
$$\phantom{H_3CS-}|\phantom{=C-}|$$
$$\phantom{H_3CS-}SCH_3\phantom{=}CN$$

(d) 
$$C_2H_5S-C=C-COOCH_3 \quad M.P.: 37°-39°C.$$
$$\phantom{C_2H_5S-}|\phantom{=C-}|\quad B.P.Kp.141-142° C./$$
$$\phantom{C_2H_5S-}SC_2H_5\phantom{=}CN \quad 0.02\ mm.\ Hg.$$

(e) 
$$H_3CS-C=C-CON(C_2H_5)_2 \quad B.P.: 143° C./$$
$$\phantom{H_3CS-}|\phantom{=C-}|\qquad 0.04\ mm.\ Hg$$
$$\phantom{H_3CS-}SCH_3\phantom{=}CN$$

(f) 
$$(CH_3)_2-CH-NH-C=C-COOCH_3 \quad M.P.: 52°-55°C.$$
$$\phantom{(CH_3)_2-CH-NH-}|\phantom{=C-}|$$
$$\phantom{(CH_3)_2-CH-NH-}SCH_3\phantom{=}CN$$

(g) 
$$CH_3-NH-C=C-COOCH_3 \quad M.P.: 88°-90° C.$$
$$\phantom{CH_3-NH-}|\phantom{=C-}|$$
$$\phantom{CH_3-NH-}SCH_3\phantom{=}CN$$

(h) 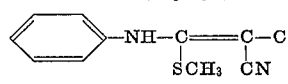
$$\mathrm{Ph}-NH-C=C-COOCH_3 \quad M.P.: 83°-84° C.$$
$$\phantom{Ph-NH-}|\phantom{=C-}|$$
$$\phantom{Ph-NH-}SCH_3\phantom{=}CN$$

(i) 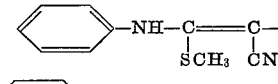
$$\mathrm{Ph}-NH-C=C-CN \quad M.P.: 174°-176° C.$$
$$\phantom{Ph-NH-}|\phantom{=C-}|$$
$$\phantom{Ph-NH-}SCH_3\phantom{=}CN$$

(k) 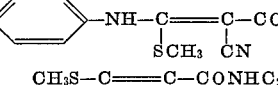
$$\mathrm{Ph}-NH-C=C-CONHCH_3 \quad M.P.: 159°-161° C.$$
$$\phantom{Ph-NH-}|\phantom{=C-}|$$
$$\phantom{Ph-NH-}SCH_3\phantom{=}CN$$

(l) 
$$CH_3S-C=C-CONHC_2H_5 \quad M.P.: 100°-102° C.$$
$$\phantom{CH_3S-}|\phantom{=C-}|$$
$$\phantom{CH_3S-}SCH_3\phantom{=}CN$$

(m) 
$$H_3CS-C=C-CONHCH(CH_3)_2 \quad M.P.: 93°-95° C.$$
$$\phantom{H_3CS-}|\phantom{=C-}|$$
$$\phantom{H_3CS-}SCH_3\phantom{=}CN$$

(n) 
$$H_3CS-C=C-CONH_2 \quad M.P.: 101°-102° C.$$
$$\phantom{H_3CS-}|\phantom{=C-}|$$
$$\phantom{H_3CS-}SCH_3\phantom{=}CN$$

(2)(a) 100 ml. of sulphuryl chloride were stirred dropwise at room temperature into a suspension of 102 grams of 1-cyano-2,2-bis-methylmercapto-acrylic acid methyl ester in 150 ml. of methylenechloride. When the brisk evolution of SO₂ had abated, the batch was refluxed for 30 minutes and then the volatile constituents were distilled off under a water-jet vacuum. The residue was fractionated under a high vacuum, to yield 1-cyano-1,2,2-trichloro-2-methylmercapto-propionic acid methyl ester

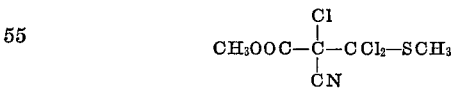

boiling at 103 to 105° C. under a pressure of 0.15 mm. Hg, melting at 38 to 41° C. as well as (b) 1-cyano-2-chloro-2-methylmercapto-acrylic acid methyl ester

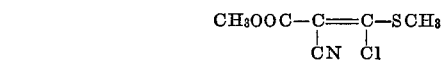

boiling at 110 to 115° C. under a pressure of 0.15 mm. Hg, melting at 94 to 96° C.

In an analogous manner the following compounds were obtained:

(c) 1 - cyano-1,2,2,-trichloro-2-methylmercapto-propionic acid ethyl ester

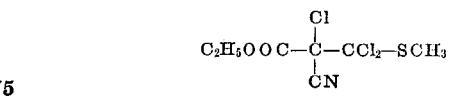

boiling at 95° C. under 0.01 mm. Hg pressure.

(d) 1 - cyano-2-chloro-2-methylmercapto-acrylic acid ethyl ester

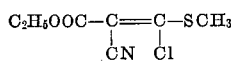

melting at 84 to 86° C.

(e) 1 - cyano - 1,2,2 - trichloro-2-methylmercapto-propionitrile

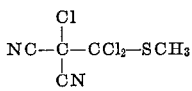

boiling at 122° C. under 16 mm. Hg pressure.

(f) 1 - cyano - 2 - chloro-2-methylmercapto-acrylonitrile

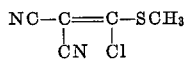

melting at 66 to 69° C.

(g) 1 - cyano-1,2,2-trichloro-2-ethylmercapto-propionic acid methyl ester

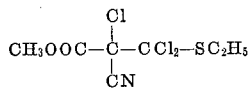

boiling at 91 to 92° C. under 0.06 mm. Hg pressure.

(3) 1 - cyano - 2 - chloro-2-methylmercapto-acrylic acid diethylamide

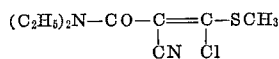

80 ml. of sulphurylchloride were stirred dropwise at room temperature into a solution of 98 g. of 1-cyano-2,2-bis-methylmercapto-acrylic acid diethylamide [boiling at 143° C. under 0.04 mm. Hg] in 100 ml. of chloroform. When the evolution of SO₂ had ceased, the batch was refluxed for 1 hour and then the volatile constituents were distilled off under a water-jet vacuum, and the oily residue was distilled under a high vacuum. The product boiled at 143 to 145° C. under 0.1 mm. Hg pressure.

(4)(a) 1-cyano-2-bromo-2-methylmercapto-acrylic acid methyl ester

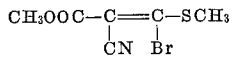

102 grams of 1-cyano-2,2-bis-methylmercapto-acrylic acid methyl ester were suspended in 200 ml. of carbon tetrachloride, 60 ml. of bromine added and the mixture was stirred for 10 hours at 65 to 70° C. The volatile constituents were then removed under a water-jet vacuum and the residue was then distilled under a high vacuum, the aid of carbon. The product melted at 110 to 113° C.

The following compounds were obtained in a similar manner:

(b)  C₂H₅NH—CO—C=C—SCH₃  M.P.: 117°–120° C.
        |   |
        CN  Br (c)  CH₃OOC—C=C—SC₂H₅  M.P.: 74°–77° C.
        |   |
        CN  Br (5)(a) 1 - cyano - 2 - isopropylamino-2-chloroacrylic acid methyl ester

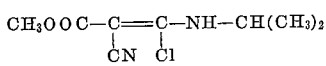

50 ml. of sulphuryl chloride were stirred dropwise at room temperature into a solution of 107 grams of 1-cyano-2-isopropylamino-2-methylmercapto - acrylic acid methyl ester (melting at 52 to 55° C.) in 100 ml. of methylenechloride. The mixture was stirred for 10 hours at room temperature. The solvent was then distilled off under a water-jet vacuum and the residue recrystallized from benzene+cyclohexane. The product melted at 77 to 79° C.

In a similar manner the following compounds were obtained:

(b) 1 - cyano - 2 - methylamino-2-chloro-acrylic acid methyl ester

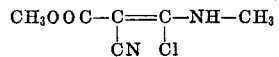

M.P.: 122–124° C.

(c) 1 - cyano - 2 - ethylamino-2-chloro-acrylic acid methyl ester

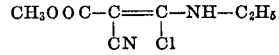

M.P.: 89–92° C.

(d) 1 - cyano - 2 - anilino-2-chloro-acrylic acid methyl ester

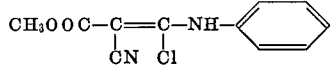

M.P.: 142–144° C. with decomposition.

(e) 1-cyano-2-anilino-2-chloroacrylonitrile

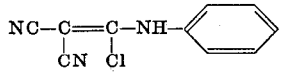

M.P.: 174–175° C. with decomposition.

(f) 1 - cyano - 2 - anilino-2-chloroacrylic acid methylamide

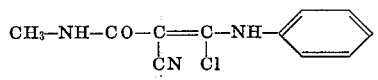

M.P.: 154–156° C. with decomposition.

(6)(a) 1 - cyano - 2,2-dichloro-acrylic acid ethylamide

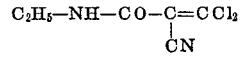

100 ml. of sulphurylchloride were stirred dropwise at room temperature in to a suspension of 87 grams of 1-cyano-2,2 - bis - methylmercapto-acrylic acid ethylamide [M.P. 100–102° C.] in 100 ml. of methylenechloride. When the vivid evolution of SO₂ had abated, the batch was refluxed for 30 minutes and then the volatile constituents were distilled off under a water-jet vacuum. The residual red oil consisted of 1-cyano-1,2,2-trichloro-2-methylmercapto-propionic acid ethylamide. Methylsulphenylchloride was eliminated by heating at 180° C. under vacuum, and the residue was then distilled under a high vacuum, the distillate being recrystallized from benezene+hexane. The product melted at 53 to 57° C.

The following compounds were obtained in a similar manner:

(b) 1 - cyano-2,2-dichloro-acrylic acid isopropylamide

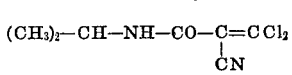

melting at 78 to 80° C.

(c) 1-cyano-2,2-dichloro-acrylic acid amide

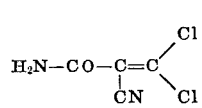

melting at 116 to 118° C.

As further active ingredients suitable for incorporation in the new preparations the following compounds may be mentioned:

(7)(a)

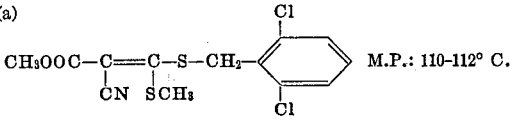   M.P.: 110–112° C.

(b) 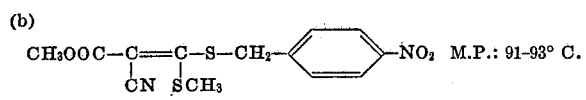 M.P.: 91–93° C.

(c) 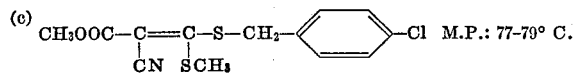 M.P.: 77–79° C.

(8)(a) 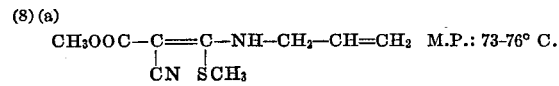 M.P.: 73–76° C.

(b) CH₃OOC—C═C—NH—(CH₂)₁₁—CH₃  M.P.: 36–37° C.
         |    |
         CN   SCH₃

(c) 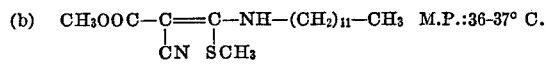 Oil (d) 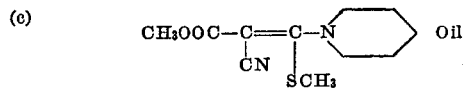 M.P.: 89–91° C.

(e) 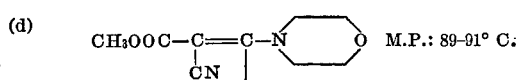 Oil (9a) 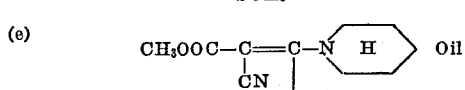 Oil.

(b) 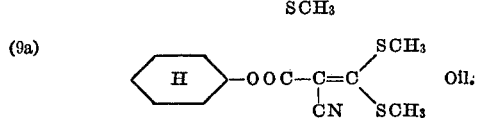 M.P.: 56–57° C.

(c) 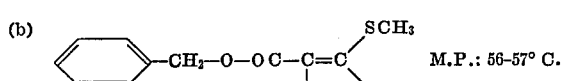 M.P.: 37–39° C.

(d) 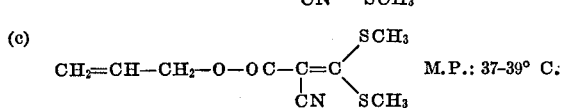 Oil.

(e) 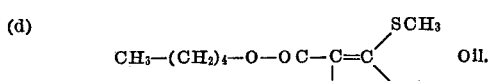 Oil.

(f) 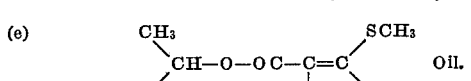 Oil.

(g) 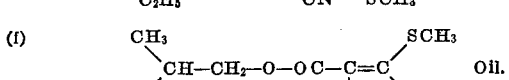 M.P.: 103–105° C.

(h) 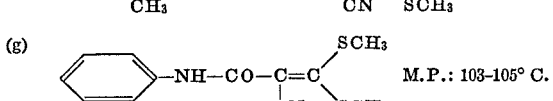 M.P.: 119–121° C.

(i) 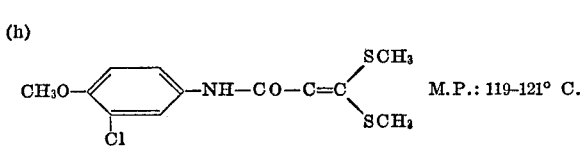 M.P.: 121–123° C.

(k) 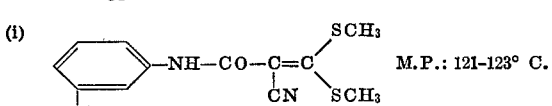 M.P.: 139–141° C.

(10) 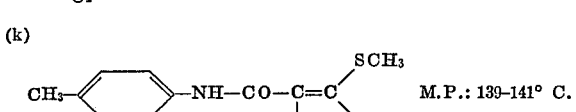 M.P.: 75–78° C.

(11) 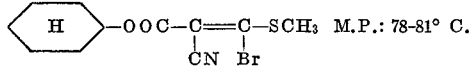 M.P.: 78–81° C.

(12) 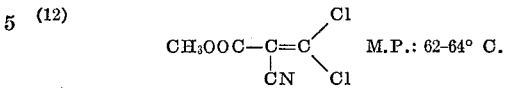 M.P.: 62–64° C.

(13) 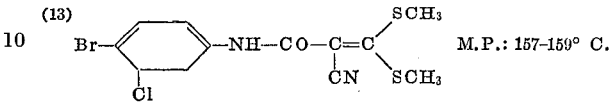 M.P.: 157–159° C.

EXAMPLE 2

(a) A spray powder was prepared from the following ingredients:

50% of one of the compounds of Example 1
40% of bolus alba (kaolin)
5% of finely dispersed silica (product marketed under the trade name Hi-Sil)
3.5% of a condensation product from 1 mol of paratertiary octylphenol and 9 mols of ethylene oxide
1.5% of sodium 1-benzyl-2-stearyl-benzimidazole-6,3'-disulphonate.

The resulting, finely ground mixture could be diluted with water in any desired proportion to form a spray broth ready for use.

(b) In each experiment 10 parts of one of the compounds of Example 1 were mixed with 15 parts of iso-octyl-phenyl-polyethoxy ethanol and made up with acetone to 100 cc. The resulting clear solution was used as a spray concentrate which could be emulsified by being poured into water.

EXAMPLE 3

Snails (*Australorbis glabratus*), having a shell diameter of 10 to 12 mm., were exposed for 24 hours to an emulsion of the active substance, prepared as described in Example 2. The snails were then kept for 48 hours in clean water and fed. After this recovery period the effect on them was inspected. The concentrations shown in the following table killed off 100% of the snails.

| Compound according to Example 1: | Concentration in parts per million |
|---|---|
| No. 1(a) | 2 |
| No. 2(b) | 0.4 |
| No. 2(d) | 0.5–0.7 |
| No. 2(f) | 1 |
| No. 4(a) | 0.4 |
| No. 6(a) | 1–2 |
| No. 6(b) | 1–2 |

The other compounds described in Example 1 produced a similar, good effect.

What is claimed is:

1. A compound of the formula

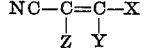

wherein X represents a member selected from the group consisting of (a) chlorine, (b) bromine, and (c) the radical —SR₁ wherein R₁ represents lower alkyl, phenyl, lower chlorophenylalkyl and lower nitrophenylalkyl, and (d) the radical

wherein R₂ and R₃ each represents a member selected from the group consisting of hydrogen, lower alkyl, lower alkenyl and phenyl, Y represents a member selected from the group consisting of chlorine and bromine and Z represents a member selected from the group consisting of (a) the radical —COOR₄ wherein R₄ represents a member selected from the group consisting of cyclohexyl and lower alkyl, and (b) the radical

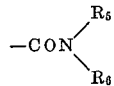

wherein $R_5$ and $R_6$ each represents a member selected from the group consisting of hydrogen, lower alkyl, phenyl and phenyl substituted by a member selected from the group consisting of chlorine, bromine, lower alkyl and lower alkoxy.

2. A compound of claim 1 having the formula

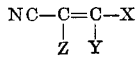

wherein X represents a member selected from the group consisting of (a) chlorine, (b) bromine, and (c) the radical $-SR_1$ wherein $R_1$ represents lower alkyl, (d) the radical

wherein $R_2$ and $R_3$ each represents a member selected from the group consisting of hydrogen, lower alkyl, lower alkenyl and phenyl, Y represents a member selected from the group consisting of chlorine and bromine and Z represents a member selected from the group consisting of (a) the radical $-COOR_4$ wherein $R_4$ represents a member selected from the group consisting of cyclohexyl and lower alkyl, (b) the radical

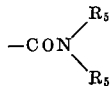

wherein $R_5$ and $R_6$ each represents a member selected from the group consisting of hydrogen and lower alkyl.

3. A member selected from the group consisting of the compound of the formula

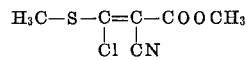

and the compound of the formula

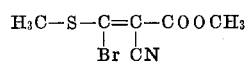

References Cited

UNITED STATES PATENTS

| | | | |
|---|---|---|---|
| 2,493,071 | 1/1950 | Kendall et al. | 260—465.4UX |
| 2,764,608 | 9/1956 | Blair | 260—465 |
| 2,774,783 | 12/1956 | Ardis | 260—465.7 |
| 2,773,892 | 12/1956 | Little | 260—465.5 |
| 2,998,426 | 8/1961 | Dickinson et al. | 260—465X |
| 3,406,183 | 10/1968 | Laliberté | 260—465X |

OTHER REFERENCES

Gompper et al., Berichte, vol. 95, pp. 2861–2884 (1962).

Söderbäck, Acta Chemica Scandinavica, vol. 17, pp. 362–376 (1963).

Eilingsfeld et al., Chemical Abstracts, vol. 62, col. 16230b (1965).

Hartke, Chemical Abstracts, vol. 61, col. 14523g (1964).

Gompper et al., Chemical Abstracts, vol. 58, col. 9067b (1962).

Allenstein, Chemical Abstracts, vol. 60, col. 4032c (1963).

Middleton et al., Chemical Abstracts, vol. 52, col. 18435i (1958).

Little, Chemical Abstracts, vol. 51, col. 8776a (1957).

CHARLES B. PARKER, Primary Examiner

D. H. TORRENCE, Assistant Examiner

U.S. Cl. X.R.

260—247, 247.1, 247.2, 293.4, 294, 294.3, 294.8, 294.9, 464, 465, 465.5, 465.7, 465.8; 424—248, 263, 267, 304